US012715577B2

(12) United States Patent
Schlunke

(10) Patent No.: US 12,715,577 B2
(45) Date of Patent: Aug. 25, 2026

(54) ATTITUDE CONTROL SYSTEM FOR A MULTIROTOR CROSSFLOW FAN eVTOL AIRBORNE CRAFT

(71) Applicant: NORAERO AS, Vear (NO)

(72) Inventor: Kim Schlunke, City Beach (AU)

(73) Assignee: NORAERO AS, Vear (NO)

( * ) Notice: Subject to any disclaimer, the term of this patent is extended or adjusted under 35 U.S.C. 154(b) by 0 days.

(21) Appl. No.: 18/682,136

(22) PCT Filed: Aug. 17, 2022

(86) PCT No.: PCT/EP2022/072988

§ 371 (c)(1),
(2) Date: Feb. 8, 2024

(87) PCT Pub. No.: WO2023/021099

PCT Pub. Date: Feb. 23, 2023

(65) Prior Publication Data

US 2025/0121935 A1 Apr. 17, 2025

(30) Foreign Application Priority Data

Aug. 17, 2021 (AU) ................................ 2021902569

(51) Int. Cl.
*B64C 29/00* (2006.01)
*B64C 11/00* (2006.01)

(52) U.S. Cl.
CPC ........ *B64C 29/0016* (2013.01); *B64C 11/006* (2013.01)

(58) Field of Classification Search
CPC B64C 15/14; B64C 9/04; B64C 21/04; B64C 23/02
See application file for complete search history.

(56) References Cited

U.S. PATENT DOCUMENTS 2,529,033 A 11/1950 Linville
2,540,404 A 2/1951 John
(Continued)

FOREIGN PATENT DOCUMENTS

CN 103587702 2/2014
CN 107672802 A 2/2018
(Continued)

OTHER PUBLICATIONS

Kewk, H. Viability of Cross-Flor Fan With Helical Blades for Vertical Take-off and Landing Aircraft. Naval Postgraduate School [online], Sep. 2012 [retrieved on Feb. 6, 2025]. Retrieved from the Internet:< URL: https://apps.dtic.mil/sti/tr/pdf/ADA567215.pdf> (Year: 2012).*

(Continued)

*Primary Examiner* — Joshua D Huson
*Assistant Examiner* — Anna L. Gordon
(74) *Attorney, Agent, or Firm* — Christian D. Abel

(57) ABSTRACT

A system for controlling yaw during vertical take-off and landing (VTOL) operation of an airborne craft, where the airborne craft comprises multiple crossflow fan lift, propulsion and control elements (LPCEs) disposed around a central longitudinal fuselage in a compact quadrotor format comprises: means for vectoring the thrust from one or more of the LPCEs on one side of the craft from a substantially vertical direction as it will be arranged for VTOL operation to a more horizontal forward or rearward direction, generating a forward or rearward thrust component perpendicular to the LPCE rotor axis, and means for adjusting the rotor speed to compensate for the loss of vertical lift, where the forward thrust component from a front and/or rear Right Hand LPCE or rearward thrust component from a front and/or rear Left Hand LPCE produces a clockwise torque when viewed from above about the central vertical axis of (Continued)

the airborne craft and the rearward thrust component from a front and/or rear Right Hand LPCE or rearward thrust component from a front and/or rear Left Hand LPCE produces an anticlockwise torque when viewed from above about the central vertical axis of the airborne craft.

3 Claims, 5 Drawing Sheets

(56) References Cited

U.S. PATENT DOCUMENTS

| | | | | |
|---|---|---|---|---|
| 2,623,711 | A | 12/1952 | Pullen | |
| 3,178,131 | A * | 4/1965 | Laing | B64C 23/02 244/206 |
| 4,482,109 | A * | 11/1984 | duPont | B64C 29/0066 244/55 |
| 6,016,992 | A | 1/2000 | Kolacny | |
| 6,527,229 | B1 | 3/2003 | Peebles | |
| 7,641,144 | B2 | 1/2010 | Kummer | |
| D710,452 | S | 8/2014 | Barajas | |
| 9,783,291 | B2 | 10/2017 | Kummer | |
| 2010/0006695 | A1 * | 1/2010 | Aguilar | B64C 29/0008 244/140 |
| 2012/0111994 | A1 | 5/2012 | Kummer | |
| 2014/0032034 | A1 | 1/2014 | Raptopoulos | |
| 2014/0048657 | A1 | 2/2014 | Lin | |
| 2018/0044013 | A1 * | 2/2018 | Groninga | B64U 30/12 |
| 2018/0222580 | A1 | 8/2018 | DeLorean | |
| 2019/0061925 | A1 | 2/2019 | Groninga et al. | |
| 2024/0336350 | A1 | 10/2024 | Schlunke | |

FOREIGN PATENT DOCUMENTS

| | | |
|---|---|---|
| CN | 107719638 | 2/2018 |
| CN | 108980080 | 12/2018 |
| CN | 110834714 Y | 2/2020 |
| EP | 0918686 | 6/1999 |
| EP | 2808253 | 12/2014 |
| EP | 3281865 | 2/2018 |
| IT | RM20100476 A | 3/2012 |
| WO | 9807622 | 2/1998 |
| WO | WO2023021054 | 2/2023 |

OTHER PUBLICATIONS

ISRWOISA dated Dec. 5, 2022, submitted inter alia as a statement of relevance for any non-English references cited therein.

IPRP dated Nov. 14, 2023 submitted inter alia as a statement of relevance for any non-English references cited therein.

Official Action and search report dated Apr. 1, 2026 in CN202280056000.6 and summarized English translation, submitted inter alia as a statement of relevance for any non-english refs cited therein.

* cited by examiner

ATTITUDE CONTROL SYSTEM FOR A MULTIROTOR CROSSFLOW FAN eVTOL AIRBORNE CRAFT

FIELD OF THE INVENTION

The present invention relates to yaw/attitude control of an airborne craft and, more specifically to a multi-rotor, distributed propulsion VTOL craft, manned or unmanned.

BACKGROUND OF THE INVENTION

Substantial prior art exists for multi-rotor helicopter designs. U.S. Pat. Nos. 2,529,033 (Linville), issued Nov. 7, 1950, 2,540,404 (John), issued Feb. 6, 1951, 2,623, 711 (Pullen), issued Dec. 30, 1952, 2,646,130 (Udelman), issued Jul. 21, 1953, U.S. Patent Publication No. 2014/0032034 (Raptopoulos), published Jan. 30, 2014, and U.S. Design Pat. No. D71O, 452 (Barajas), issued Aug. 5, 2014, are just a few of the numerous U.S. patents that disclose variations on the multi-rotor theme. Multi-rotor airborne craft designs have proliferated, largely because of the simplicity and utility provided by the multiple, identical fan and motor units. With a single motor speed input to these units, they control lift or altitude, craft attitude in pitch, roll and yaw and thrust or forward flight speed. For example, for attitude control, the simple axial fan, quadrotor format, generates roll by increasing the speed of the two rotors on one side of the craft and decreasing it on the other, generates pitch by increasing the speed of the two rotors a the front and decreasing it on the two rotors at the back and generates yaw by increasing the speed of two diagonally opposite rotors while decreasing the speed of the other two. This yaw torque is a result of diagonally opposite fans rotating in the same direction and the fans on the opposite diagonal rotating in the opposite direction. Any difference between the speed of these two pars then generates a resultant yaw torque on the craft. It should be noted that altitude is maintained during each of these manoeuvres because speed is increased on two fans while decreasing it on another two. It should also be noted that since half the compliment of fans rotates in one direction and the other half rotates in the opposite direction, gyroscopic forces and spool up torques are cancelled.

The cross-flow fan (CFF), tangential fan, or transverse fan, partially embedded within an airfoil and with suitable exit ducting to produce distributed propulsion and potentially the attendant propulsive efficiency, has been disclosed in numerous technical journals including (DANG). Due to the 2D nature of the flow the fan readily integrates into an airfoil for use in both thrust production and vectoring and boundary layer control. In addition to increased propulsive efficiency, embedded crossflow fan propulsion provides reduced noise and increased safety, since the propulsor is now buried within the structure of the aircraft (e.g. no exposed propellers).

In addition, multiple cross-flow fan propelled aircraft designs have been disclosed in U.S. Pat. Nos. 6,016,992 (Kolacny), issued Jan. 25, 2000, 6,527,229 (Peebles), issued Mar. 4, 2003, 7,641,144 (Kummer), issued Jan. 5, 2010, 8,579,573 35 (Kolacny), issued Nov. 12, 2013, and U.S. Patent Publication Nos. 2012/0111994 (Kummer), published May 10, 2012 and 2014/0048657 (Lin), published Feb. 20, 2014. These designs do not disclose a compact quadrotor cross-flow fan layout and generally maintain a substantially vertical craft attitude in take-off and landing which is not accepted for passenger use but may be acceptable for drone applications. To counter this problem alternative VTOL solutions have therefore been proposed using multiple axial fans in U.S. Pat. No. 9,783,291 B2 (Kummer), issued Oct. 10, 2017. This allows substantially horizontal craft attitude during take-off and landing but adds considerable weight and complexity to the craft for use during only a very short period of its operational mission.

SUMMARY OF THE INVENTION

However while there are apparent advantages in multirotor craft, particularly those with embedded CFFs, a significant attitude control challenge is created when a multirotor layout deploys CFFs instead of axial fans. The mission in most applications of an VTOL craft consumes most energy during horizontal forward flight which requires the forward flight geometry to be prioritised by design and optimised over the needs of attitude control in hovering flight for example. This means that multiple crossflow fans are best deployed with all fans rotating in the one direction so that each fan helps provide efficient distributed propulsion in the one forward direction. This in turn means that diagonal rotors cannot rotate in the opposite direction to those on the other diagonal. Thus the conventional method used for yaw control as noted above in craft with multiple axial fans is no longer feasible. In addition, the gyroscopic forces generated by the rotor when the craft is rolling or yawing and the rotor spool up reaction torques are no longer cancelled.

A novel crossflow fan lift, propulsion and control element (LPCE) solution is proposed in Australian Provisional Patent 2021902564 (Schlunke) and the said element is incorporated herein by reference. A number of novel multi-rotor crossflow fan eVTOL craft are proposed in Provisional Patent 2021902568 (Schlunke) and the said craft are incorporated herein by reference.

The Prior art does not disclose multiple compact crossflow fan LPCEs, disposed around a craft in a compact quad format to provide the control authority and simplicity benefits of a quadrotor, efficient distributed propulsion in forward flight and sufficient vertical thrust for VTOL operation. Neither does the prior art disclose a solution to the challenge of controlling yaw when a multiple crossflow fan LPCEs are deployed with all fans rotating in the one direction so that each LPCE provides distributed propulsion in the one forward direction. The mission in most applications of an eVTOL craft consumes most energy during horizontal forward flight which requires the forward flight geometry to be prioritised by design and optimised over the needs of attitude control in hovering flight for example.

It is therefore an object of this invention to provide a system for yaw control that overcomes at least some of the problems as described herein.

The object of the invention is achieved by means of the patent claims.

In one embodiment, there is provided a system for controlling yaw during VTOL operation of an (e)VTOL airborne craft comprising multiple short span, crossflow fan LPCEs, as described in Australian Provisional Patent 2021902564 (Schlunke) disposed around a central longitudinal fuselage in a compact quadrotor format as described in Provisional Patent 2021902568 (Schlunke), where the said system involves the vectoring of the thrust from the LPCEs on one side of the craft in a more horizontal direction while increasing the rotor speed to compensate for the attendant loss of vertical lift.

There is also provided a system for controlling yaw during VTOL operation of an (e)VTOL airborne craft comprising multiple short span, crossflow fan LPCEs, as described in Australian Provisional Patent 2021902564 (Schlunke) disposed around a central longitudinal fuselage in a compact quadrotor format as described in Australian Provisional Patent 2021902568 (Schlunke) said system comprising the generation of a lateral thrust component by each LPCE that is parallel to the axis of the CFF in each LPCE and in the plane of the flat exit jet, said lateral thrust component producing a clockwise torque when viewed from above about said crafts central vertical axis from both the Front Right Hand (FRH) and Rear Left Hand(RLH) LPCEs and an anti-clockwise torque when viewed from above about said crafts central vertical axis from both the Front Left Hand (FLH) and Rear Right Hand(RRH) LPCEs.

In one embodiment, there is provided a system for controlling yaw during vertical take-off and landing (VTOL) operation of an airborne craft, where the airborne craft comprises multiple crossflow fan lift, propulsion and control elements (LPCEs) comprising a rotor and being disposed around a central longitudinal fuselage in a compact quadrotor format. The system comprises means for vectoring the thrust from one or more of the LPCEs on one side of the craft from a substantially vertical direction as it will be arranged for VTOL operation to a more horizontal forward or rearward direction, generating a forward or rearward thrust component perpendicular to the LPCE rotor axis, and means for adjusting the rotor speed to compensate for the loss of vertical lift. The forward thrust component from a front and/or rear Right Hand LPCE or rearward thrust component from a front and/or rear Left Hand LPCE produces a clockwise torque when viewed from above about the central vertical axis of the airborne craft and the rearward thrust component from a front and/or rear Right Hand LPCE or rearward thrust component from a front and/or rear Left Hand LPCE produces an anticlockwise torque when viewed from above about the central vertical axis of the airborne craft.

In one embodiment there is provided a system for controlling yaw during vertical take-off and landing (VTOL) operation of an airborne craft, where the airborne craft comprises multiple crossflow fan lift, propulsion and control elements (LPCEs) disposed around a central longitudinal fuselage in a compact quadrotor format. The system comprises means for controlling each LPCE to generate a lateral thrust component that is parallel to the axis of the crossflow fan in each LPCE and in the plane of the flat exit jet. The lateral thrust component from both a Front Right Hand (FRH) and Rear Left Hand (RLH) LPCEs produces a clockwise torque when viewed from above about the central vertical axis of the airborne craft and said lateral thrust component from both a Front Left Hand (FLH) and Rear Right Hand(RRH) LPCEs produces an anti-clockwise torque when viewed from above about the central vertical axis of the airborne craft.

The LPCEs can comprise helically bladed rotors to produce said lateral thrust component directed away from the central fore and aft vertical plane of the craft and as distant as possible from the central lateral vertical plane of the craft.

The system may further comprise yaw vanes and ducts that produce said lateral thrust component directed away from the central fore and aft vertical plane of the craft and as distant as possible from the central lateral vertical plane of the craft.

The yaw vanes may be positioned so as to engage with the exit thrust of the rotors during VTOL operation only, advantageously provide minimal drag in forward horizontal flight and also advantageously provide feet for landing and protecting the flaps of the LPCE.

The system for controlling yaw may comprise means for speeding up the FRH and RLH rotors and slowing down the FLH and RRH rotors, thereby producing a clockwise torque when viewed from above about the said crafts vertical axis and maintaining a constant downward thrust.

The system may comprise means for speeding up the FLH and RRH rotors and slowing down the FRH and RLH rotors, thereby producing an anticlockwise torque when viewed from above about the said crafts vertical axis and maintaining a constant downward thrust.

The described system may enable the use of conventional quadrotor software in a crossflow fan eVTOL airborne craft.

There may also be provided a system for controlling yaw when turning during forward flight operation of an eVTOL airborne craft comprising multiple short span, crossflow fan LPCEs, as described in Provisional Patent 2021902564 (Schlunke) disposed around a central longitudinal fuselage in a compact quadrotor format as described in Provisional Patent 2021902568 (Schlunke) said system comprising the sizing of the gyroscopic forces generated by the rotors in the LPCEs to induce roll that redirects the crafts lift vector to have a lateral component that balances the centrifugal forces generated by said turning.

BRIEF DESCRIPTION OF THE DRAWINGS

The present invention will be more fully understood and appreciated by reading the following Detailed Description in conjunction with the accompanying drawings, in which.

DETAILED DESCRIPTION

Figure 1:
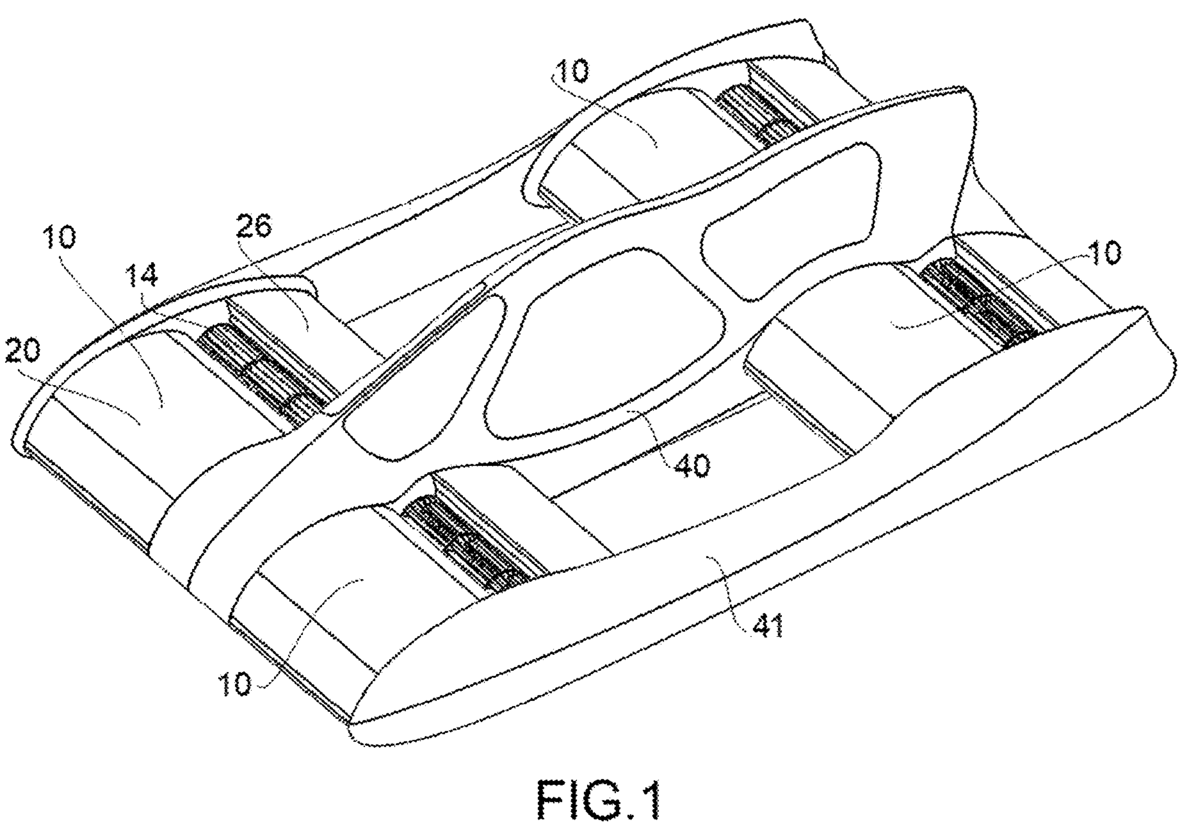
FIG. 1 is a diagram of the front view of a preferred embodiment of a craft according to the present invention.

Referring now to the drawings, there is seen in FIG. 1 the front view of an eVTOL airborne craft comprising multiple short span, crossflow fan Lift Propulsion and Control Elements (LPCEs) 10, disposed around a central longitudinal fuselage 40 in a compact quadrotor format to create a craft with a footprint substantially similar to a car and capable of both efficient distributed propulsion in forward or rearward flight and sufficient vertical thrust for VTOL operation. Each LPCE 10 being comprised of an airfoil 20, a flexlip 24 attached to and forming part of airfoil 20, a crossflow fan rotor 14, a flap 26 rotatable and mounted about the axis of rotor 14 and an exit duct 15 from the crossflow fan rotor 14.

Figure 2:
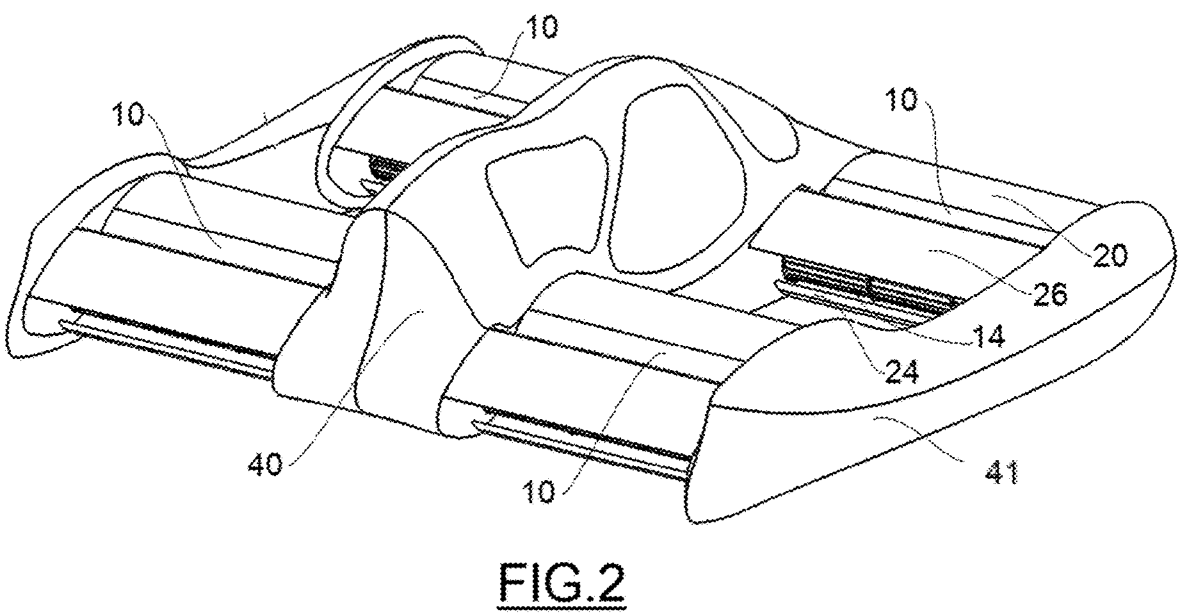
FIG. 2 is a diagram of the rear view of a preferred embodiment of a craft according to the present invention.

Referring now to FIG. 2 there is seen the rear view of the eVTOL airborne craft of FIG. 1 comprising multiple short span, crossflow fan Lift Propulsion and Control Elements (LPCEs) 10, disposed around a central longitudinal fuselage 40 in a compact quadrotor format to create a craft with a footprint substantially similar to a car and capable of both efficient distributed propulsion in forward flight and sufficient vertical thrust for VTOL operation. Each LPCE 10 being comprised of an airfoil 20, a flexlip 24 attached to and forming part of airfoil 20, a crossflow fan rotor 14, a flap 26 rotatable and mounted about the axis of rotor 14 and an exit duct 15 from the crossflow fan rotor 14.

Figure 3:
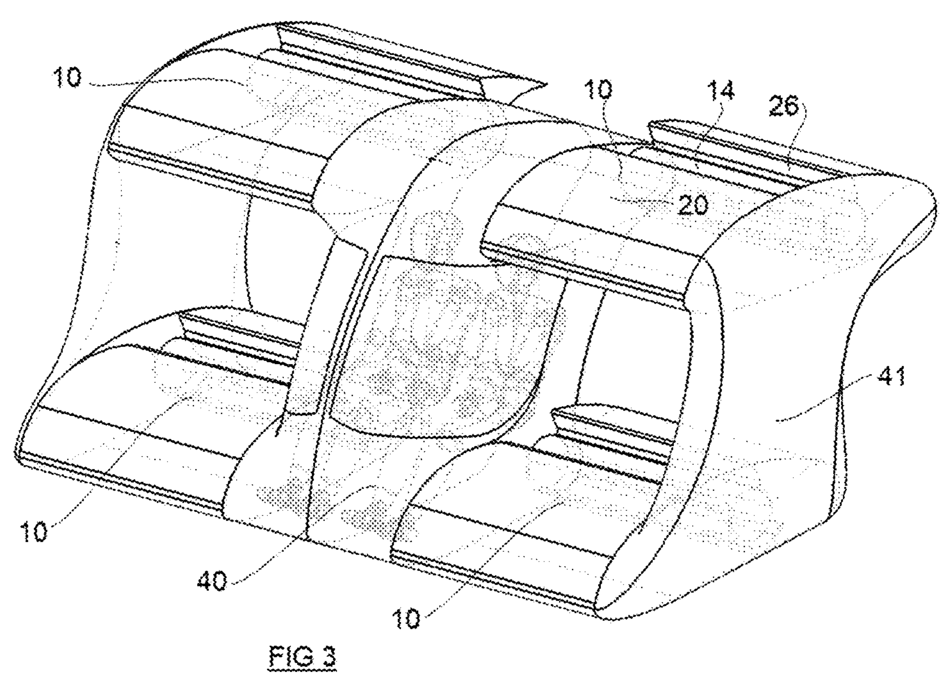
FIG. 3 is a diagram of the front view of a further preferred embodiment of a craft according to the present invention.

Referring now to FIG. 3 there is seen the front view of an eVTOL airborne craft comprising multiple short span, crossflow fan Lift Propulsion and Control Elements (LPCEs) 10, disposed around a central fuselage 40 in a compact quadrotor format to create a craft with a footprint substantially similar to a car and capable of both efficient distributed propulsion in forward flight and sufficient vertical thrust for VTOL operation. Each LPCE 10 being comprised of an airfoil 20, a flexlip 24 attached to and forming part of airfoil 20, a crossflow fan rotor 14, a flap 26 rotatable and mounted about the axis of rotor 14 and an exit duct 15 from the crossflow fan rotor 14.

In this example, the central fuselage 40 is proportioned to receive two occupants seated in tandem, and comprises-two substantially similar Lift Propulsion and Control Elements (LPCEs) 10 mounted to the starboard side of said fuselage, one in a forward position, and one in an aft position, two substantially similar LPCEs 10 mounted to the port side of said fuselage, one in a forward position, one in an aft position, and two wingtip fences 41, terminating the outer extremity of the two LPCEs on either side of the craft and extending chord wise from forward of the leading edge of the forward mounted LPCE to aft of the trailing edge of the flap on the aft LPCE.

In this embodiment of the invention, the orientation of the LPCEs is longitudinal relative to the footprint of a car and the seating position is lateral, allowing longer span LPCEs to be implemented while still preserving a similar footprint to a car.

Figure 4:
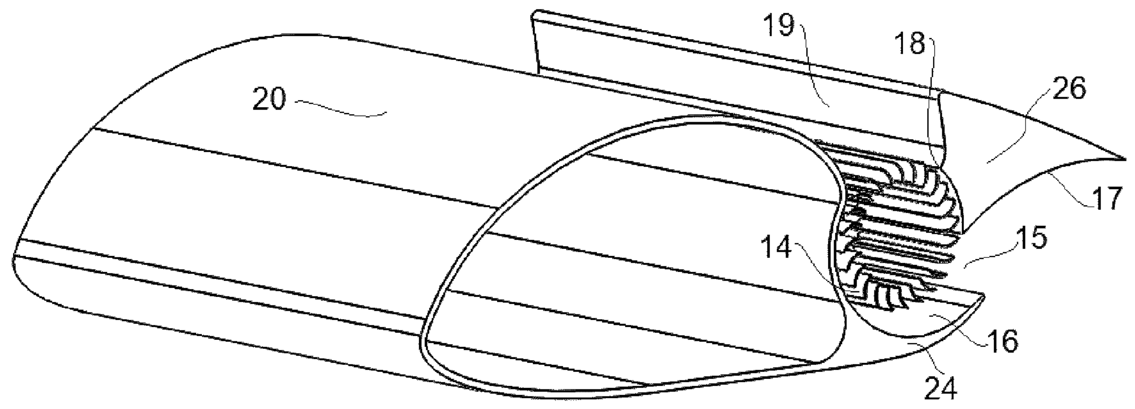
FIG. 4 is a diagram of a lift, propulsion and control element (LPCE) showing the exit duct geometry of the flap and flexlip when configured for forward flight.

Referring now to FIG. 4 there is seen an example of an LPCE with an airfoil 20, a flexlip 24 attached to and forming part of airfoil 20, a crossflow fan rotor 14, a flap 26 rotatable and mounted about the axis of rotor 14 and an exit duct 15 from the crossflow fan rotor 14 and formed by the lower face 17 of flap 26 and the upper face 16 of flexlip 24. With the flexlip 24 and flap 26 configured in this position and with a suitable fan speed, a longitudinal jet of air from duct 15 is ejected along the length of the lift, propulsion and control element to produce forward or rearward thrust and achieve distributed propulsion, and desirably the forward (or rearward) flight propulsive efficiency benefits. Synergistically, the edge 18 of face 19 restricts the inlet area to the crossflow fan to provide an optimal flow rate through the fan for best propulsive efficiency.

Figure 5:
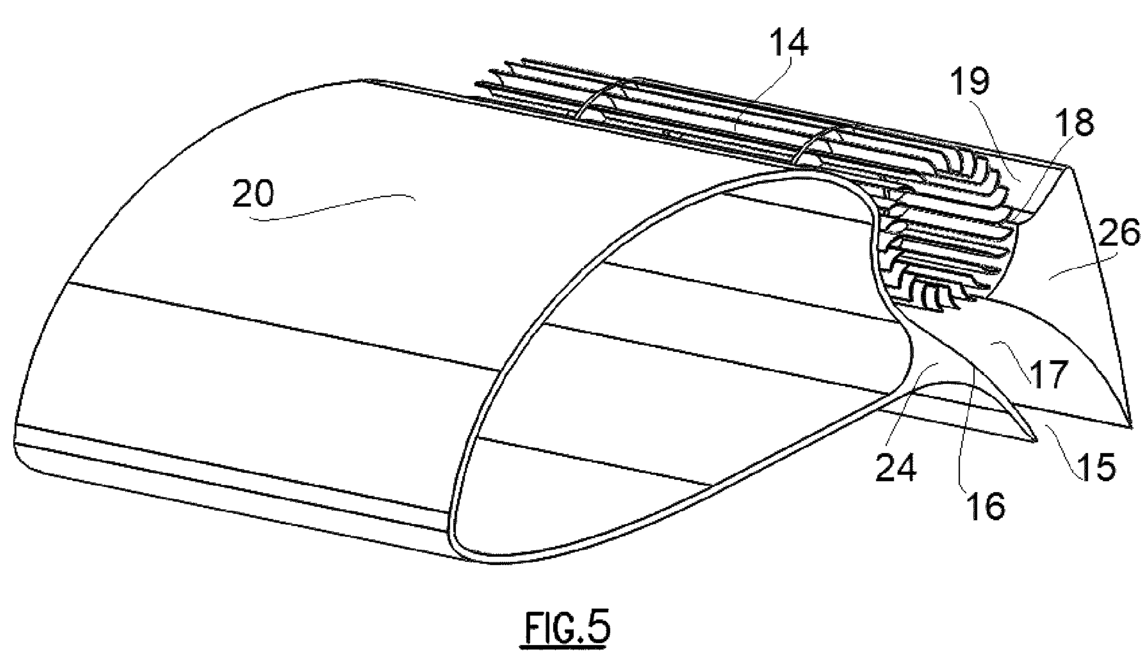
FIG. 5 is a diagram of an LPCE showing the exit duct geometry of the flap and flexlip when configured for VTOL operation.

Referring now to FIG. 5 there is seen an LPCE with an airfoil 20, a flexlip 24 attached to and forming part of airfoil 20, a crossflow fan rotor 14, a flap 26 rotatable and mounted about the axis of rotor 14 and an exit duct 15 from the crossflow fan rotor 14 and formed by the lower face 17 of flap 26 and the upper face 16 of flexlip 24. With the flexlip 24 and flap 26 configured in this position, ie. with the flexlip and flap rotated with respect to FIG. 4, and with a suitable fan speed, a longitudinal jet of air from duct 15 is ejected along the length of the lift, propulsion and control element to achieve a substantially vertical jet thereby producing upward thrust or vertical lift for VTOL operation. Synergistically, the edge 18 of face 19 moves to create a much larger inlet area to the crossflow fan thereby providing an optimal flow rate through the fan for vertical thrust.

Figures 6, 7:
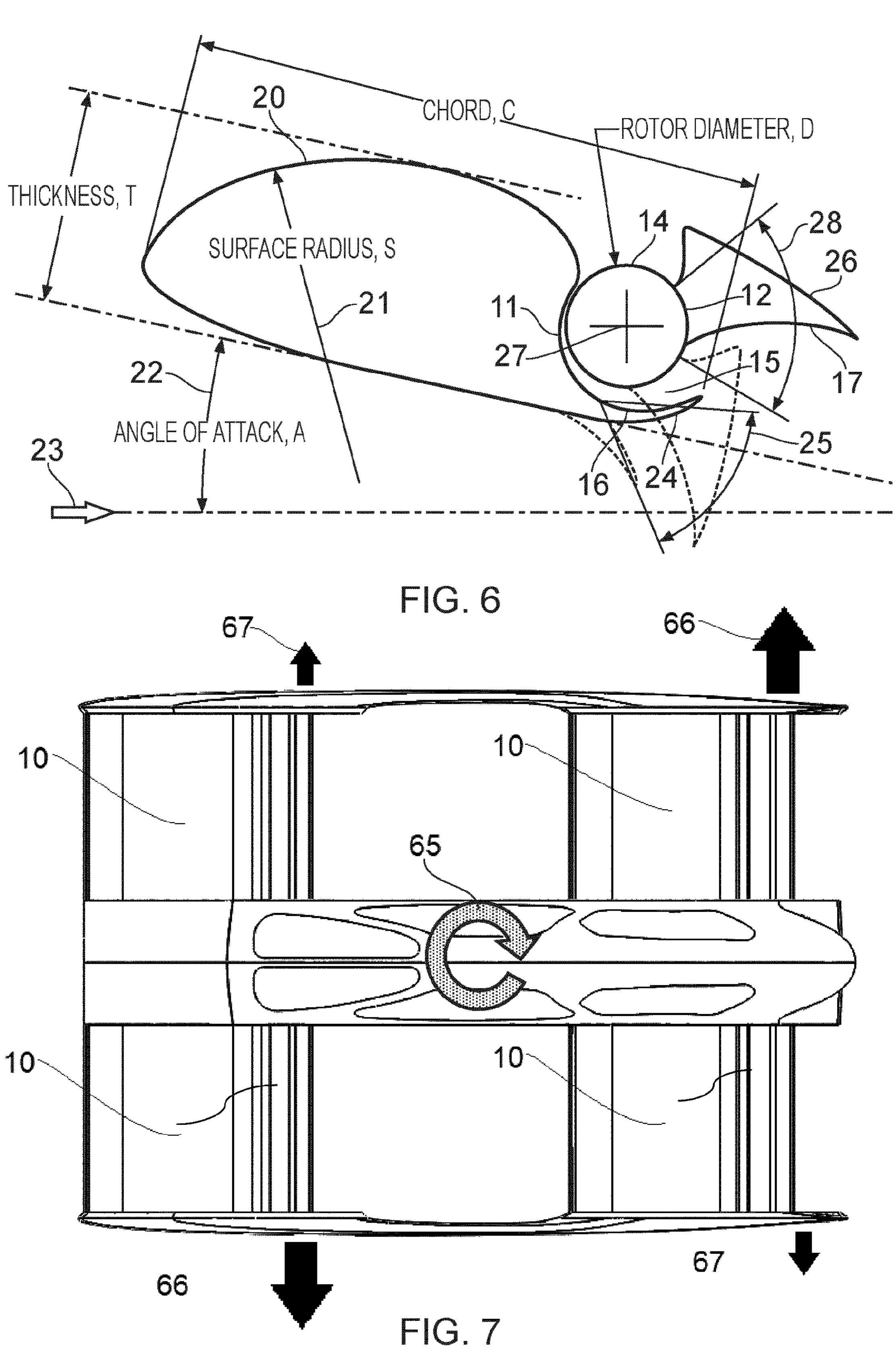
FIG. 6 is a diagram of the cross section of an LPCE according to the present invention showing the airfoil, embedded crossflow fan and exit duct geometry and the range of movement of the flap and flexlip.
FIG. 7 is a diagram of the craft shown in FIG. 1 when viewed in plan from above illustrating the rotational yaw torque produced when a lateral thrust component is produced by a helical rotor and/or a yaw vane the FLH fan speed is increased in conjunction with the diagonally opposite RRH fan while the FRH fan speed is decreased in conjunction with the diagonally opposite RLH fan.

Referring now to FIG. 6, there is seen a diagrammatic section of an LPCE, for example the one illustrated in FIGS. 3 and 4, with an airfoil 20 with an upper surface radius 21 and an angle of attack 22 to the airstream direction 23 and a crossflow fan assembly consisting of a rotor 14, a rear wall 11 and a vortex wall 12, a rear flexlip 24 which flexes through an angle 25 and has an upper face 16, a flap 26 that rotates about the rotor axis 27, can rotate through an angle 28 and has a lower face 17, an exit duct 15 formed by face 16 and face 17. Desirably, the angle of attack 22 is set achieve a maximum lift to drag ratio in conjunction with the angle of the exit duct jet. Desirably the area ratio of the fan inlet area to fan exit area is optimised by the movement of flap 26 for both high propulsive efficiency in the upper position and high vertical thrust in the lower position. This LPCE can potentially be deployed for attitude control functions, including yaw in addition to providing sufficient lift for VTOL and efficient propulsion in forward flight.

Yaw could be controlled during VTOL operation in a craft as described in FIG. 1 by vectoring the thrust away from the vertical and toward a more horizontal direction on one or both of the LPCEs on the Right Hand side of the craft to achieve an anticlockwise yaw torque, viewing the craft from above. Similarly, by vectoring the thrust away from the vertical and toward a more horizontal direction on one or both of the LPCEs on the Left Hand side of the craft, a clockwise yaw torque is achieved viewing the craft from above. Desirably the rotor speed would be increased to compensate for any loss of lift in the vertical direction and thereby avoid roll. However, all fans rotate anticlockwise so the gyroscopic forces from the rotors during anticlockwise yaw induces roll left so little compensation is necessary. There will be some pitch upward as the rotors spool up to compensate for lost lift but this is easily compensated by preferentially speeding the rotor of the rear LPCE.

Referring now to FIG. 7, there is seen a diagram of the craft of FIG. 1 from above with four LPCEs, 10 disposed about the fuselage. A clockwise yaw torque 65 is indicated as viewed from above and the lateral thrust 66 and 67 from each of the LPCEs required to induce the torque 65 is shown. A vane and/or a helical rotor at each LPCE can produce a lateral component of thrust in the directions indicated, particularly during VTOL operation. There is seen a larger thrust component 66 from the Front Left Hand 66 and Rear Right Hand 66 LPCEs. This can be achieved by increasing the speed of the rotor of diagonally opposite LPCEs. Any increased lift as a result can be compensated by a reduction in the speed of the Front Right Hand 66 and Rear Left Hand LPCEs which delivers reduced thrust 67 increasing the force difference and hence the desired yaw torque. In this way conventional attitude control software from the ubiquitous axial fan quadrotors can be utilised because the speed difference between diagonally opposite pairs of fans is also used in these devices for yaw control.

Figure 8:
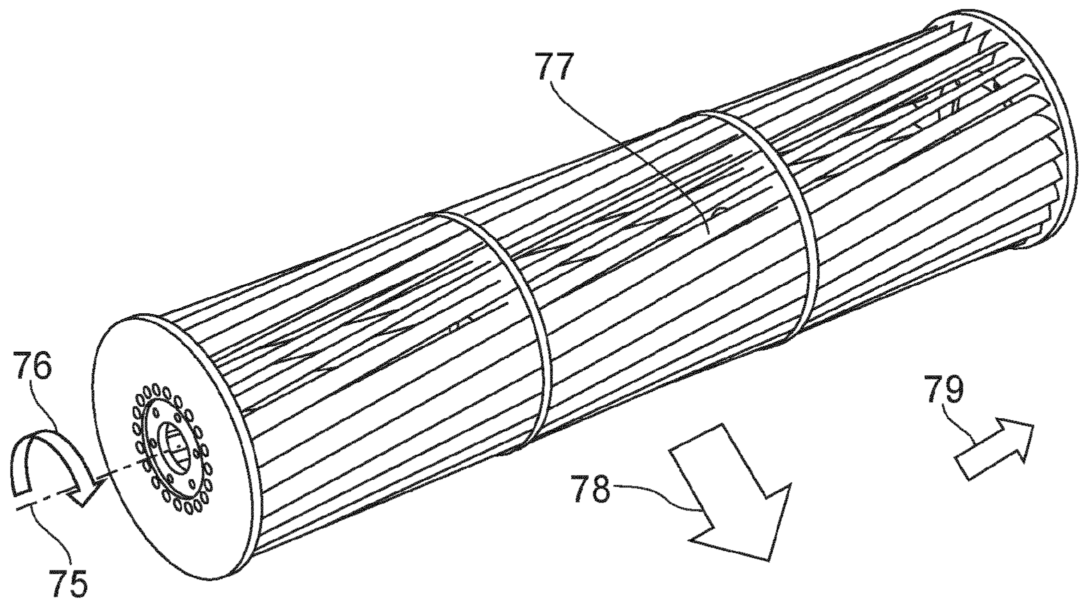
FIG. 8 is a diagram illustrating the flow from a helical rotor which when rotated in the direction shown around the axis shown, produces a primary thrust direction and a smaller lateral component in the direction shown.

Referring now to FIG. 8 a rotor is illustrated as might be deployed in one of the LPCEs disclosed above, said rotor having an axis 75, and helically disposed blades 77. This rotor, when rotated in direction 76 about axis 75 inside the housing of an LPCE will generate a thrust 78 that is primarily radial from the rotor. However, the helix angle of the blades will generate a lateral component of thrust 79 as shown which can then be used for yaw stability as described herein. Desirably the helical blades can also lower noise levels from the LPCE and strengthen the rotor.

Figure 9:
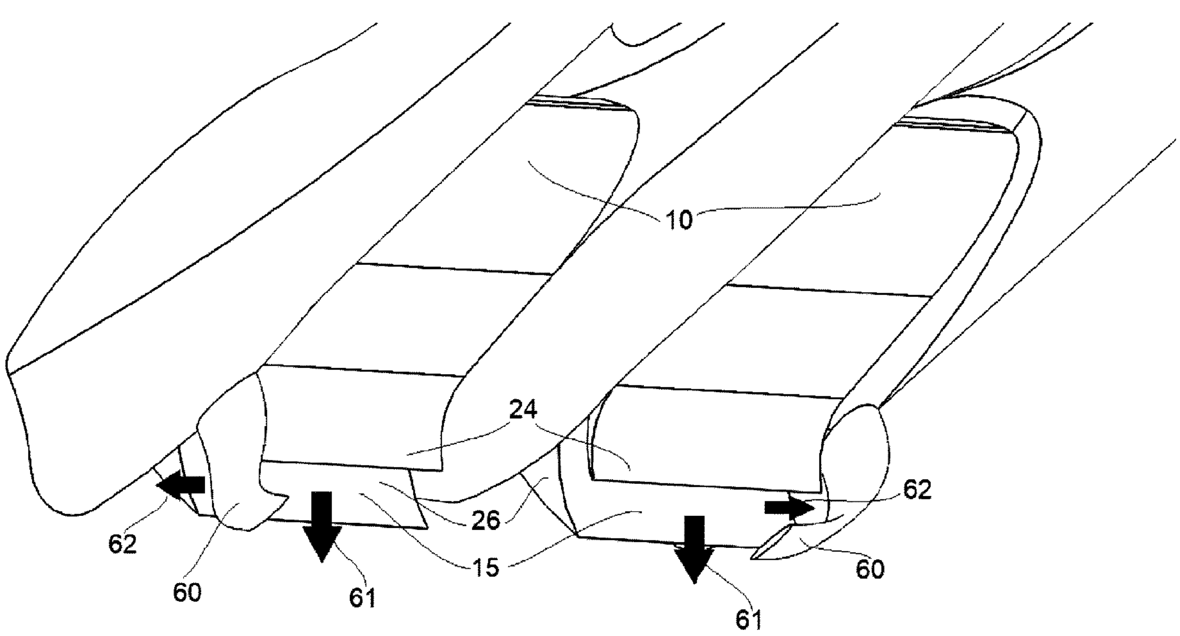
FIG. 9 is a diagram of the rear of the underside of the craft of FIG. 1 illustrating a preferred embodiment of the yaw vanes at the rear of the craft, the primary exit flow direction in VTOL operation and the lateral component of thrust produced by the yaw vanes and/or a helical rotor.

Referring now to FIG. 9 there is seen a view of the rear of the underside of the craft of FIG. 1 illustrating a preferred embodiment of the yaw vanes 60 as they would be applied to the two rear LPCEs 10. The upper surface of flexlips 24 and the lower surface of flaps 26 define a duct 15 which directs a substantially vertical jet 61 when the craft is operated in VTOL. Yaw vanes 60 redirect some of this jet 61 to produce a lateral component of thrust 62 which is used as described in FIG. 7 to generate yaw. Desirably this vane has an upper vertical part attached to and part of a wing fence that provides minimal frontal area and drag in forward flight and a lower more horizontal part that also presents minimal frontal area and drag in forward flight but which redirects part of the vertical airstream 61 in the direction 62 said upper part extending low enough to protect flap 26 and flexlip 24 as they are extended for VTOL during landing and additionally supports the craft when landed. It is a novel aspect of this invention that said yaw vane 60 only redirects the air in exit duct 15 when the craft is in vertical or hovering flight.

The invention claimed is:

1. A vertical take-off and landing (VTOL) airborne craft comprising a system for controlling yaw during vertical take-off and landing (VTOL) operation of an airborne craft, where the airborne craft further comprises:

four crossflow fan lift, propulsion and control elements (LPCEs), each comprising a rotor and at least one airfoil with a flexing lip and a flap, wherein, the LPCEs are disposed around a central longitudinal fuselage of the airborne craft in a quadrotor format, and wherein the rotors in the crossflow fan lift, propulsion and control elements (LPCEs) rotate in one common direction, yaw vanes that are positioned lower than the flaps and flexing lips of the LPCEs, protecting the flaps and flexing lips during landing and that provide feet for supporting the airborne craft once landed, and two wing fences terminating the outer extremity of two LPCEs on each side of the airborne craft, wherein the yaw vanes having an upper vertical part attached to the wing fences so as to engage with the exit thrust of the rotors during VTOL operation only and provide minimal drag in forward horizontal flight, wherein the flexing lip and the flap are movable to vector thrust from the four of the LPCEs of the airborne craft from a substantially vertical direction for VTOL operation to a more horizontal forward or rearward direction for forward or rearward thrust perpendicular to the rotor axis of an LPCE rotor, and the rotor speed can be controlled to compensate for the loss of vertical lift when vectoring thrust from vertical direction to forward or rearward direction, where the forward thrust component from a front and/or rear Right Hand LPCE or rearward thrust component from a front and/or rear Left Hand LPCE produces a clockwise torque when viewed from above about the central vertical axis of the airborne craft and the rearward thrust component from a front and/or rear Right Hand LPCE or forward thrust component from a front and/or rear Left Hand LPCE produces an anticlockwise torque when viewed from above about the central vertical axis of the airborne craft.

2. A vertical take-off and landing (VTOL) airborne craft comprising a system for controlling yaw during vertical take-off and landing (VTOL) operation of an airborne craft, where the airborne craft further comprises:

four crossflow fan lift, propulsion and control elements (LPCEs), each comprising a rotor and at least one airfoil with a flexing lip and flap, where the four LPCEs are disposed around a central longitudinal fuselage in a quadrotor format and where the rotors of the four LPCEs rotate in one common direction, yaw vanes that are positioned lower than the flaps and flexing lips of the LPCEs, protecting the flaps and flexing lips during landing and that provide feet for supporting the airborne craft once landed, and two wing fences terminating the outer extremity of two LPCEs on each side of the airborne craft, wherein the yaw vanes having an upper vertical part attached to the wing fences so as to engage with the exit thrust of the rotors during VTOL operation only and provide minimal drag in forward horizontal flight, wherein each LPCE can generate a lateral thrust component that is parallel to a rotor axis of the crossflow fan in each LPCE, where said lateral thrust component from both a Front Right Hand (FRH) and a Rear Left Hand (RLH) LPCE produces a clockwise torque when viewed from above about a central vertical axis of the airborne craft, and said lateral thrust component from both a Front Left Hand (FLH) and a Rear Right Hand (RRH) LPCE produces an anti-clockwise torque when viewed from above about the central vertical axis of the airborne craft.

3. The airborne craft according to claim 2, where the LPCEs comprise helically bladed rotors configured to produce said lateral thrust component directed away from a central fore and aft vertical plane of the airborne craft.

* * * * *